US009728906B2

(12) United States Patent
Colahan et al.

(10) Patent No.: US 9,728,906 B2
(45) Date of Patent: Aug. 8, 2017

(54) POWER ADAPTER WITH A SINGLE-PIECE INSULATOR ASSEMBLY

(71) Applicant: APPLE INC., Cupertino, CA (US)

(72) Inventors: Ian P. Colahan, Menlo Park, CA (US); Fidel Vista, Quezon (PH)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/156,629

(22) Filed: May 17, 2016

(65) Prior Publication Data

US 2016/0276783 A1 Sep. 22, 2016

Related U.S. Application Data

(63) Continuation of application No. 14/351,287, filed as application No. PCT/US2012/059798 on Oct. 11, 2012, now Pat. No. 9,343,850.

(60) Provisional application No. 61/547,020, filed on Oct. 13, 2011.

(51) Int. Cl.
*H01R 13/66* (2006.01)
*H01R 13/504* (2006.01)
*H02M 7/00* (2006.01)
*H02M 7/04* (2006.01)
*H01B 17/64* (2006.01)
(Continued)

(52) U.S. Cl.
CPC ......... *H01R 13/6675* (2013.01); *H01B 17/64* (2013.01); *H01R 4/70* (2013.01); *H01R 13/665* (2013.01); *H01R 31/065* (2013.01); *H02M 7/003* (2013.01); *H02M 7/04* (2013.01); *H01R 13/504* (2013.01); *H01R 13/6633* (2013.01)

(58) Field of Classification Search
CPC .. H01R 13/24; H01R 13/665; H01R 13/6633; H01R 31/065; H01R 4/70; H01B 17/145
See application file for complete search history.

(56) References Cited

U.S. PATENT DOCUMENTS

| 3,930,707 A | 1/1976 | Venaleck et al. |
| 4,156,219 A | 5/1979 | Coleman |
| 5,403,208 A | 4/1995 | Gladden et al. |

(Continued)

FOREIGN PATENT DOCUMENTS

| CN | 101552514 A | 10/2009 |
| CN | 101552541 A | 10/2009 |

(Continued)

OTHER PUBLICATIONS

International Preliminary Report on Patentability for International PCT Application No. PCT/US2012/059798, mailed Apr. 24, 2014, 8 pages.

(Continued)

*Primary Examiner* — James Harvey
*Assistant Examiner* — Oscar C Jimenez
(74) *Attorney, Agent, or Firm* — Kilpatrick Townsend and Stockton, LLP

(57) ABSTRACT

An AC-to-DC power adapter comprises a single-piece insulator unit. The various components of the power adapter such as a transformer, other circuitry, etc. are attached to the single-piece insulator unit. The single-piece insulator unit has embedded channels to provide electrical connectivity between the circuitry, The entire assembly is placed in housing and a cap assembly having prongs to connect to a AC wall outlet is ultrasonically welded to the housing.

20 Claims, 12 Drawing Sheets

(51) Int. Cl.
  *H01R 4/70* (2006.01)
  *H01R 31/06* (2006.01)

(56) References Cited

U.S. PATENT DOCUMENTS

| | | | |
|---|---|---|---|
| 7,121,847 B1 | 10/2006 | Jetton et al. | |
| 7,978,489 B1 | 7/2011 | Telefus et al. | |
| 8,011,975 B1 | 9/2011 | Kim et al. | |
| 8,021,183 B2 * | 9/2011 | Early | H01R 13/665 439/382 |
| 8,460,017 B1 * | 6/2013 | Green | H01R 13/44 439/131 |
| 8,597,049 B2 | 12/2013 | von Zur et al. | |
| 8,790,124 B2 * | 7/2014 | Lee | H01R 31/06 439/131 |
| 2003/0082952 A1 | 5/2003 | Miles et al. | |
| 2005/0266730 A1 | 12/2005 | Lanni et al. | |
| 2008/0315831 A1 | 12/2008 | Li et al. | |
| 2008/0315931 A1 | 12/2008 | Maeda | |
| 2009/0093149 A1 | 4/2009 | Mancini et al. | |
| 2011/0300754 A1 * | 12/2011 | Kim | H01R 13/506 439/620.21 |
| 2012/0155041 A1 * | 6/2012 | Lin | H01R 9/091 361/752 |
| 2012/0169272 A1 * | 7/2012 | Khalepari | H01R 13/6675 320/107 |
| 2013/0300366 A1 * | 11/2013 | Liu | H01R 31/065 320/111 |
| 2014/0308853 A1 | 10/2014 | Colahan et al. | |
| 2016/0276783 A1 | 9/2016 | Colahan et al. | |

FOREIGN PATENT DOCUMENTS

| | | |
|---|---|---|
| CN | 101901998 A | 12/2010 |
| CN | 103959574 | 7/2014 |
| CN | 105914537 | 8/2016 |
| TW | 200903962 | 1/2009 |
| TW | 200903962 A | 1/2009 |
| TW | M404542 U | 5/2011 |
| TW | I345358 | 7/2011 |
| TW | 201330467 | 7/2013 |
| WO | 0108262 A2 | 2/2001 |
| WO | 2013055948 | 4/2013 |

OTHER PUBLICATIONS

Non-Final Office Action for U.S. Appl. No. 14/351,287, mailed Sep. 16, 2015, 20 pages.
Notice of Allowance for U.S. Appl. No. 14/351,287, mailed Feb. 17, 2016, 8 pages.
Office Action for Chinese Patent Application No. 201280049938.1, mailed Aug. 19, 2015, 18 pages.
Office Action for Chinese Patent Application No. 201280049938.1, mailed Apr. 22, 2016, 7 pages.
Office Action for Chinese Patent Application No. 201280049938.1, mailed Oct. 8, 2016, 6 pages.
Office Action for European Patent Application No. 12787558.1, mailed May 21, 2014, 2 pages.
Office Action for European Patent Application No. 12787558.1, mailed Jan. 21, 2015, 3 pages.
Office Action for European Patent Application No. 12787558.1, mailed Jul. 21, 2015, 3 pages.
Office Action for European Patent Application No. 12787558.1, mailed Feb. 15, 2016, 5 pages.
Office Action for Taiwanese Patent Application No. 101137816, mailed Jun. 23, 2014, 21 pages.
Notice of Allowance for Taiwanese Patent Application No. 101137816, mailed May 26, 2015, 3 pages.
Musavi et al., "Energy Efficiency in Plug-in Hybrid Electric Vehicle Chargers: Evaluation and Comparison of Front End AC-DC Topologies", Energy Conversion Congress and Exposition (ECCE), IEEE, Sep. 2011, pp. 273-280.
International Search Report and Written Opinion for International PCT Application No. PCT/US2012/059798, mailed Apr. 9, 2013, 13 pages.

* cited by examiner

POWER ADAPTER WITH A SINGLE-PIECE INSULATOR ASSEMBLY

CROSS-REFERENCES TO RELATED APPLICATIONS

This application is a Continuation of U.S. patent application Ser. No. 14/351,287, filed Apr. 11, 2014; which claims benefit of the National Stage entry of PCT/US2012/059798 filed Oct. 11, 2012; which claims benefit under 35 USC §119(e) to U.S. Provisional Patent Application No. 61/547,020 filed Oct. 13, 2011, the disclosure of which are incorporated by reference herein in their entirety for all purposes.

BACKGROUND

Power adapters are ubiquitous and are used in a variety of electronic devices. Some power adapters convert an incoming AC voltage into a DC voltage for use be a connected electronic devices. Some other power adapters convert an AC waveform to another AC waveform, where the output voltage and frequency can be set arbitrarily. Most electronic devices operate on a DC voltage. Examples of electronic devices include but are not limited to computers, portable media players, tablets, mobile phones, etc.

Most of these electronic devices have an internal battery that can be charged by applying a DC voltage to the battery. The battery stores the charge, which can then be used by the electronic device for its operation. Most electrical energy supplied to homes and industries is in the form of AC voltage. Thus, in order to charge the battery of an electronic device, it is necessary to convert the AC voltage to the required DC voltage. Many of the power adapters in use today are designed to accept incoming AC voltage, e.g., via a receptacle connector located in the wall (commonly known as a "wall outlet"), and convert it to a DC voltage. The explanation of AC and DC voltage is omitted here since they well-known in the art.

In a power adapter, a transformer converts the incoming AC power to DC power and associated circuitry may filter and regulate the DC to a desired value. Each of the individual components of a basic conventional AC-DC adapter is well-known in the art. Often some sort of insulator material is provided between the high-voltage circuitry of the adapter (e.g., AC voltage) and the low voltage circuitry (e.g., DC voltage). The insulator material helps to protect the low voltage circuitry from being affected by malfunction in the high voltage circuitry.

Conventionally, the process of assembling a power adapter includes many manual steps. For example, an insulating material such as a Kapton® tape is hand-wrapped around the high-voltage components in order to provide the required insulation. Since a manual process is prone to large variations in quality and reliability, a better process of manufacturing a power adapter will greatly alleviate the quality issues and aid in the manufacturability of the power adapters. Other potential problems may be related to the use of separate printed circuit boards (i.e., one for the AC circuit and the other for the DC circuit), in that the boards must be electrically connected to each other prior to final assembly. This can result in manufacturing problems since individual connection wires may need to be hand soldered and because the small components must be held in place in a very small area during the manufacturing process. Some attempts at dealing with the potential wiring issues have been made by utilizing ribbon cable. Such cables, however, can be bulky, stiff and hard to work with in the small confines of power adaptors. They may, for example, require tape and/or glue to be held in place.

SUMMARY

Embodiments of the present invention are generally related to power adapters. More specifically, some embodiments of the present invention are related to a single-piece insulator assembly that has features and channels embedded therein that assist in quick and accurate assembly of a power adapter.

Some embodiments of the present invention provide a power adapter. The power adapter includes a first connector and a first electrical assembly coupled to the first connector and configured to receive an incoming AC voltage and convert it to a DC voltage. The power adapter further includes a second connector and a second electrical assembly coupled to the second connector and configured to accept the DC voltage and output the DC voltage via the second connector. In addition, the power adapter also includes a single-piece insulator unit that has a first side and a second side. The first electrical assembly is coupled to the first side and the second electrical assembly is coupled to the second side. The insulator assembly further includes one or more channels embedded within it to provide an electrical path between the first electrical assembly and the second electrical assembly at designated locations. The power adapter further includes a power transformer attached to the single-piece insulator unit and a common mode choke attached to the single-piece insulator unit.

Some embodiments of the present invention provide an insulator assembly. The insulator assembly includes a single-piece structure that has a first side and a second side. Each of the first and the second side has features thereon to enable the single-piece structure to accept a first circuitry and a second circuitry, respectively. There are one or more channels embedded in the single-piece structure. Each of the one or more channels extends from the first side to the second side. The single-piece structure further includes electrically conducting members disposed in each of the one or more channels to provide electrical connection between the first circuitry and the second circuitry. In a particular embodiment, the single-piece structure is made from a material that has a V-0 flame rating, e.g., glass-filled nylon.

Some other embodiments of the present invention provide a method for assembling or manufacturing a power adapter. The method includes providing a single-piece insulator unit that has a first side and a second side. Each of the first side and the second side includes features that are formed thereon. The method further includes attaching a transformer at a first predefined location of the single-piece insulator unit and attaching a common mode choke at a second predefined location of the single-piece insulator unit. The method also includes attaching a primary printed circuit board (PCB) including a first circuitry to the first side of the single-piece insulator unit and attaching a secondary PCB including a second circuitry to the second side of the single-piece insulator unit. In addition the method includes providing electrical connectivity between the primary PCB and the secondary PCB. Finally, the method includes attaching a cap assembly to the single-piece insulator unit, placing the single-piece insulator unit inside housing, and attaching the cap assembly to the housing to seal the single-piece insulator unit within the housing.

The following detailed description, together with the accompanying drawings will provide a better understanding of the nature and advantages of the embodiments of the present invention.

DETAILED DESCRIPTION

Embodiments of the present invention are generally related to power adapters. More specifically, some embodiments of the present invention provide a power adapter that includes a single-piece insulator structure. The insulator structure includes features that are designed to accept a primary printed circuit board (PCB), a transformer, and a secondary PCB. The insulator structure has embedded channels in it and metal members can be inserted in the channels to create an electrical path between the primary PCB and the secondary PCB. Power adapters for use with portable electronic devices are disclosed. The power adapters disclosed herein can be manufactured in a more efficient and consistent manner that can result in one or more advantages. For example, the use of a single-piece insulator assembly, as described below, results in consistent, reliable and adequate spacing between the primary and secondary circuits such that the power adapters consistently meet or exceed the required safety tolerances. In addition, for example, the use of conductive pins/members instead of wires, as described below, to electrically couple the primary and secondary stages together also results in reduced manufacturing requirements and more consistently manufactured and reliable end products.

Other embodiments of the present invention provide method for manufacturing a power adapter. The method includes providing a single-piece insulator structure that has embedded electrical pathways that extend from one side to another side of the insulator structure. A common mode choke, a transformer, a primary PCB that includes high-voltage (e.g., AC) circuitry, and a secondary PCB that includes a low-voltage (e.g., DC) circuitry are attached to the insulator structure in that order to form the electrical assembly of the power adapter. The input to the common mode choke is connected to the input prongs on a cap assembly. The entire assembly is then inserted into a housing and the cap assembly is ultrasonically welded to the housing to complete the adapter.

Figure 1A:
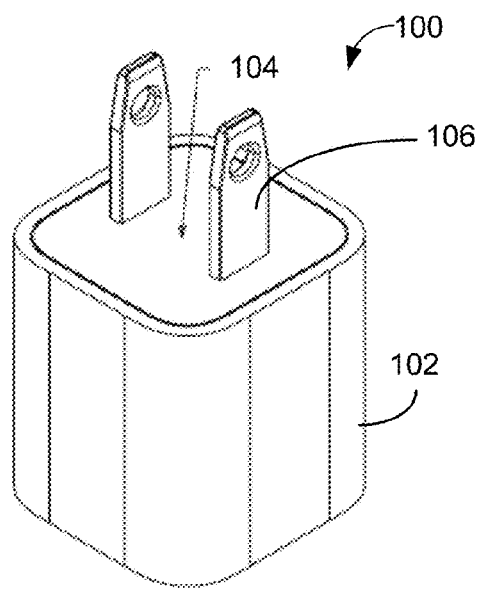
FIGS. 1A and 1B illustrate a power adapter according to an embodiment of the present invention.
Figure 1B:
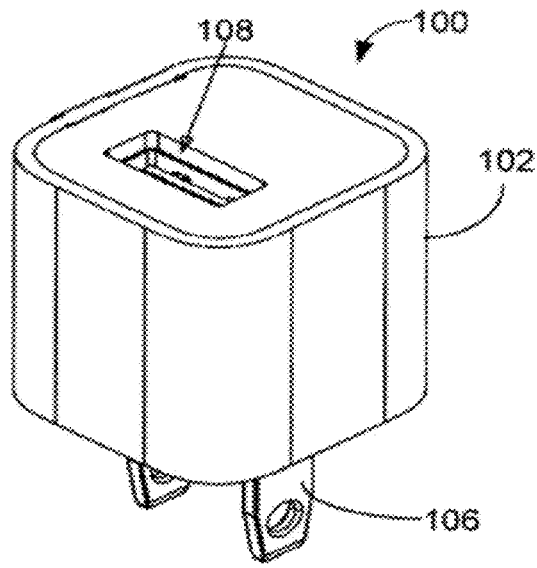

FIGS. 1A and 1B illustrate isometric views of a power adapter 100 according to an embodiment of the present invention. Power adapter 100 includes a housing 102 and a cap assembly 104. Housing 102 can be made of any suitable material, e.g., plastic, rubber, ceramic, silicon, etc. Although housing 102 is illustrated as having a rectangular shape, this is not needed. Housing 102 can have any other shape as needed for a particular application. Cap assembly 104 may include two or more connectors 106. Connectors 106 are designed to mate with a corresponding receptacle connector that provides AC power, e.g., a wall outlet. At an end opposing the cap assembly, adapter 100 may include another connector 108. For example, connector 108 may be a USB connector; however, any other connector may also be used. Connector 108 can be used to couple adapter 100 with an external device to power or charge the external device. For example, a cable having a complimentary USB connector can be connected to connector 108. The other end of the cable may have any other suitable connector based on the application. Examples of such connector includes but is not limited to a μUSB connector, a 30-pin connector used by Apple Inc. device, a Lightning® connector used by Apple Inc. devices, etc. In one embodiment, adapter 100 is about 28 mm in height (not including prongs 106) or about 34-35 mm in height including prongs 106. The width of the adapter may be between 25 mm and 27 mm and the depth of the adapter may be between 25 mm and 28 mm.

Figure 2:
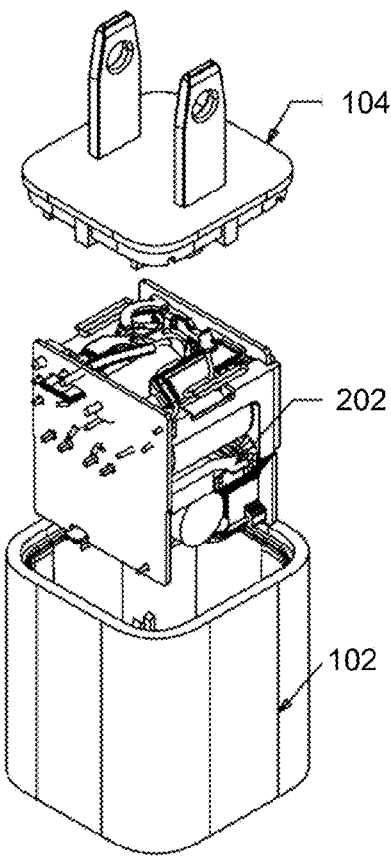
FIG. 2 is a partially exploded view of a power adapter illustrating various top-level components of the power adapter according to an embodiment of the present invention.

Power adapter 100 can receive AC power (e.g., 110-220 VAC) via connectors/prongs 106 and output DC power (e.g., 5-20 V) via connector 108. The DC voltage can be used by a connected external device for its operation or charging its battery as described above. FIG. 2 illustrates an exploded view of adapter 100 according to an embodiment of the present invention. As illustrated in FIG. 2, adapter 100 includes housing 102 and cap assembly 104. Disposed within housing 102 is an electrical assembly 202. Electrical assembly 202 includes circuitry for receiving AC voltage, converting the AC voltage to a desired DC voltage, and outputting the DC voltage via another connector (not shown). Housing 102 may include rails (not shown) or guide pins that allow precise positioning of electrical assembly 202 within housing 102. In some embodiments, electrical assembly 202 may need to be inserted in a particular orientation in order to fit inside housing 102.

Figure 3A:
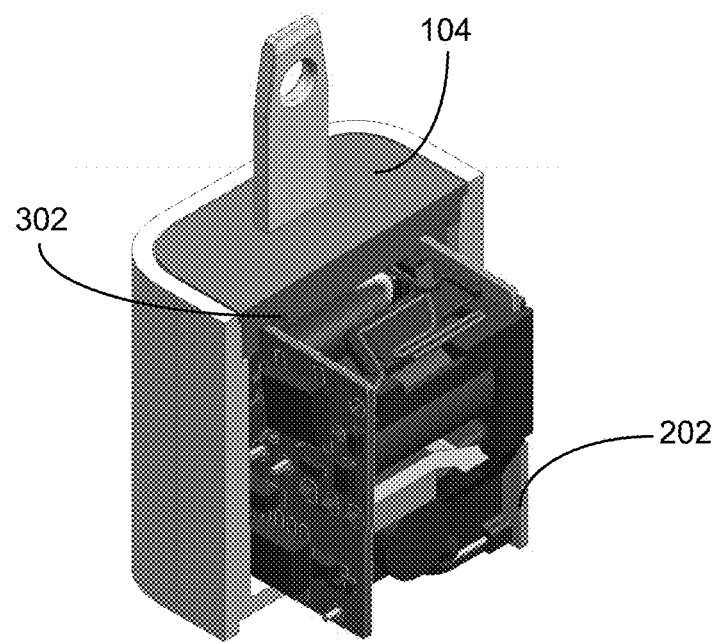
FIGS. 3A and 3B illustrates partial cross-sectional views of the adapter according to an embodiment of the present invention.
Figure 3B:
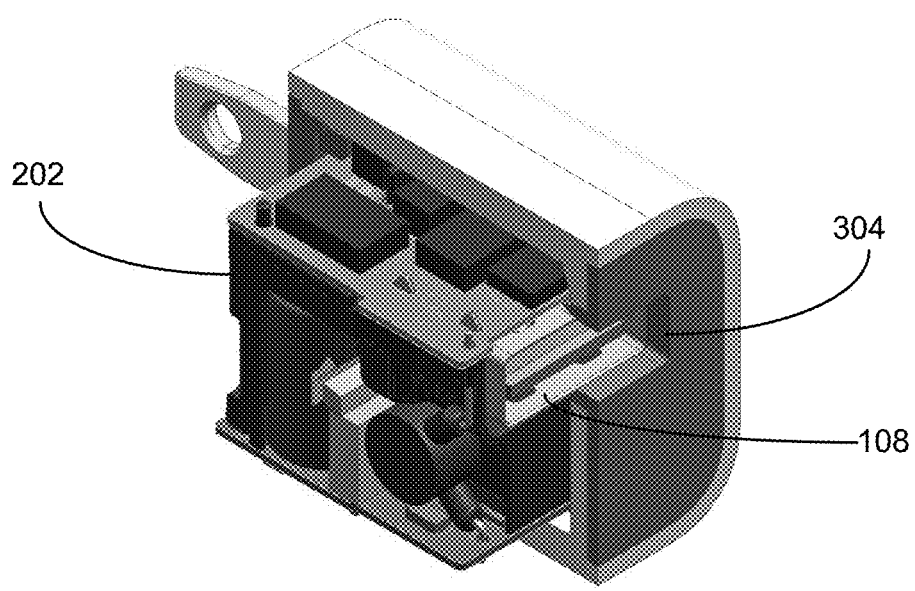

FIGS. 3A and 3B illustrate partial cross-sectional views of adapter 100 according to an embodiment of the present invention. As illustrated in FIG. 3A, electrical assembly 202 can be positioned using channels 302 that may be formed in cap assembly 104 and an internal surface of housing 102 opposing cap assembly 104. An opening 304 in a side of housing 102 that is opposite to cap assembly 104 can accommodate connector 108.

Figure 4:
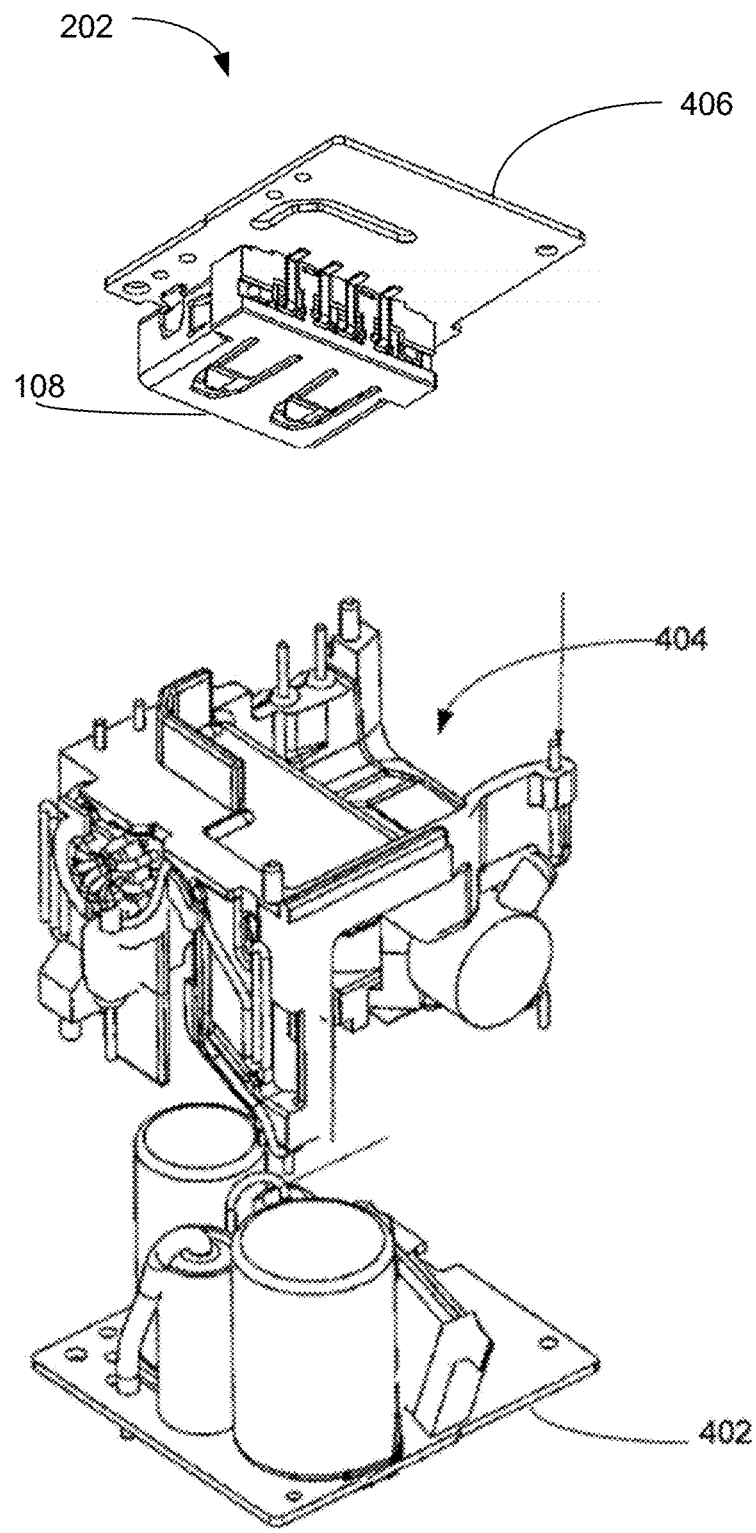
FIG. 4 illustrates an exploded view of the top-level electrical assembly according to an embodiment of the present invention.

FIG. 4 is an exploded view of electrical assembly 202 showing its constituent components according to an embodiment of the present invention. Electrical assembly 202 includes a single-piece insulator 404 that includes pre-defined features that facilitate attachment of other components of electrical assembly 202. Insulator 404 is described in more detail below. Electrical assembly 202 may also include a primary PCB 402 having circuitry formed thereon. Primary PCB 402 may include multiple electronic components such as capacitors, resistors, transistors, etc. that are exposed to the incoming AC voltage, which is higher than the output DC voltage. Primary PCB 402 may be manufactured using any of the conventional techniques. Electrical assembly further includes a secondary PCB 406 that has circuitry thereon. The circuitry on secondary PCB may include filter circuit for smoothing out the DC voltage before being outputted. Secondary PCB 406 also includes connector 108 that can be used to output the DC voltage to external devices.

Figure 5:
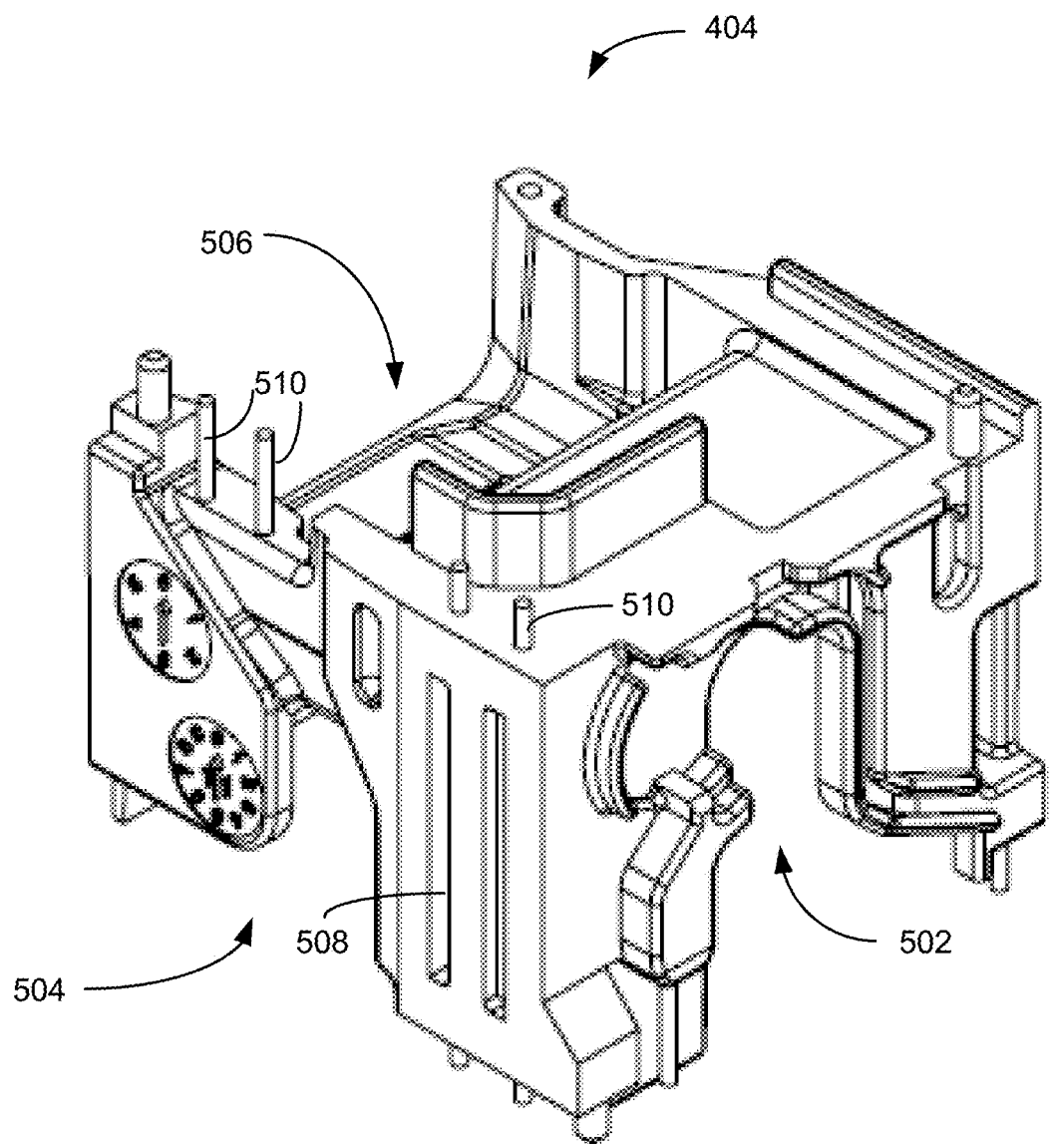
FIG. 5 is an isometric view of the single-piece insulator according to an embodiment of the present invention.

FIG. 5 illustrates an isometric view of a single-piece insulator 404 according to an embodiment of the present invention. Insulator 404 can be prepared using a mold and filling the mold with glass-filled nylon to generate a single homogenous unit. As can be seen, insulator 404 has several features formed thereon. Each of these features serve a specific purpose. A recess 502 is designed to accommodate sections of a primary PCB (e.g., primary PCB 402 of FIG. 4). Opening 504 is designed to accommodate a transformer that is used to convert AC voltage to DC voltage. Recessed feature 506 is designed to accommodate a secondary PCB (e.g., PCB 406 of FIG. 4) and its associated connector (e.g., connector 108 of FIG. 4). Several channels 508 are formed in the insulator walls. Channels 508 extend from a first surface of insulator 404 that receives the primary PCB to a second surface that receives the secondary PCB. Conductive members/pins 510 that are disposed in channels 508 provide electrical connectivity between the primary PCB and the secondary PCB. Pins 510 can be inserted into channels 508 within such that they extend slightly beyond each end of the channels. In some embodiments, conductive pins 510 may be manufactured using stainless steel as a core material, which would provide desired strength and stiffness. The core could be coated with a layer of copper to provide pins 510 with excellent conductivity properties. Then the layer of copper could be coated with a layer of nickel such that the pins should form excellent solder joints when soldered to other components or PCBs. The use of pins and channels simplifies the manufacturing process while improving overall reliability (due to the interconnections being physically fixed in place instead of being taped and/or glued in place). In addition, the use of pins and channels also reduces the overall space requirements for wiring, which is at a premium in a confined space such as within housing 102.

Insulator 404 may at the same time provide insulation and isolation between other sections of the two PCB's. In order to protect the low voltage sections of the adapter from the high voltage sections, it is beneficial to have an insulating material between the two voltage sections. If the power adapter is sufficiently large in dimension, air can be used as an effective insulator. However, in compact power adapter such as the one described herein, the various components of the adapter are packed densely leading to very little space between the low and high voltage components. In these circumstances, air is not an effective insulating medium and other insulating mechanisms may be needed.

In some embodiments, insulator 404 may be made from a material that is V-0 safety rated per the UL standards. For example, in an embodiment, insulator 404 may be made from glass-filled nylon. Other suitable materials such as silicone-based materials may also be used. Since the manufacturing process for the adapter includes several rounds to wave soldering, any material chose for insulator 404 needs to withstand wave soldering temperatures, which range from between 200° C. to 300° C. In some embodiments, insulator 404 may have the following dimensions: a length in the range of about 20 mm to 22 mm, a width in the range of about 19 mm to 21 mm, and a height in the range of about 18 mm to 21 mm.

As described above, an insulating tape can be used to cover the high voltage components; however such a manual technique is difficult to replicate with accuracy in a mass manufacturing environment. Also, allowing such an important step in the manufacturing process to be manual may expose the adapter to increased failure rates and more importantly is a significant safety hazard. A failure of the insulation may result in arcing or permanently damage the adapter and/or the external device connected to the adapter. By providing a single-piece insulator as described above, the manufacturing process is greatly simplified and is more repeatable since the number of manual steps are significantly decreased or eliminated altogether.

FIGS. 6A-6J illustrates steps in the assembly process of a power adapter according to an embodiment of the present invention. FIGS. 7A and 7B illustrate a corresponding flow diagram 700 for the assembly process depicted in FIGS. 6A-6J. The assembly process is described below with reference to FIGS. 6A-6J and 7A-7B. The entire assembly process may be automated or some parts of the assembly process may be manual while others may be automated. A different machine may be used to perform each step of the process or several steps in the process may be performed by a single machine. One skilled in the art will realize numerous variations in how the process is performed.

Figure 6A:
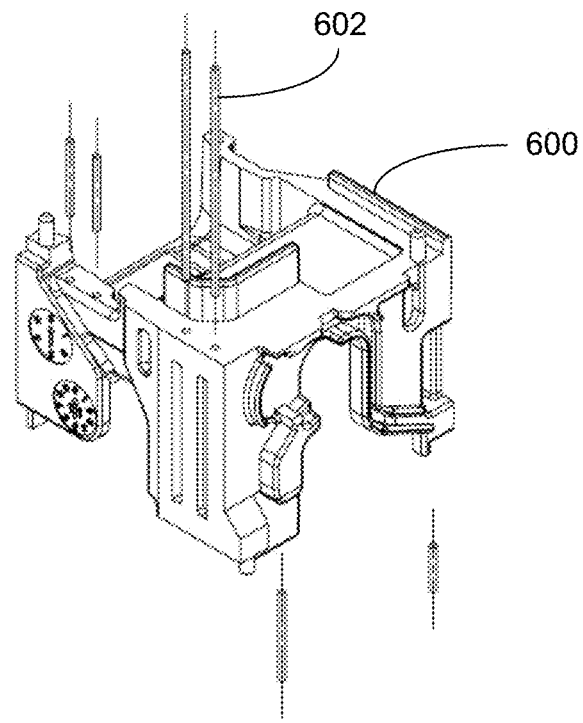
FIGS. 6A-6J illustrate a process for assembling the power adapter according to an embodiment of the present invention.
Figure 7A:
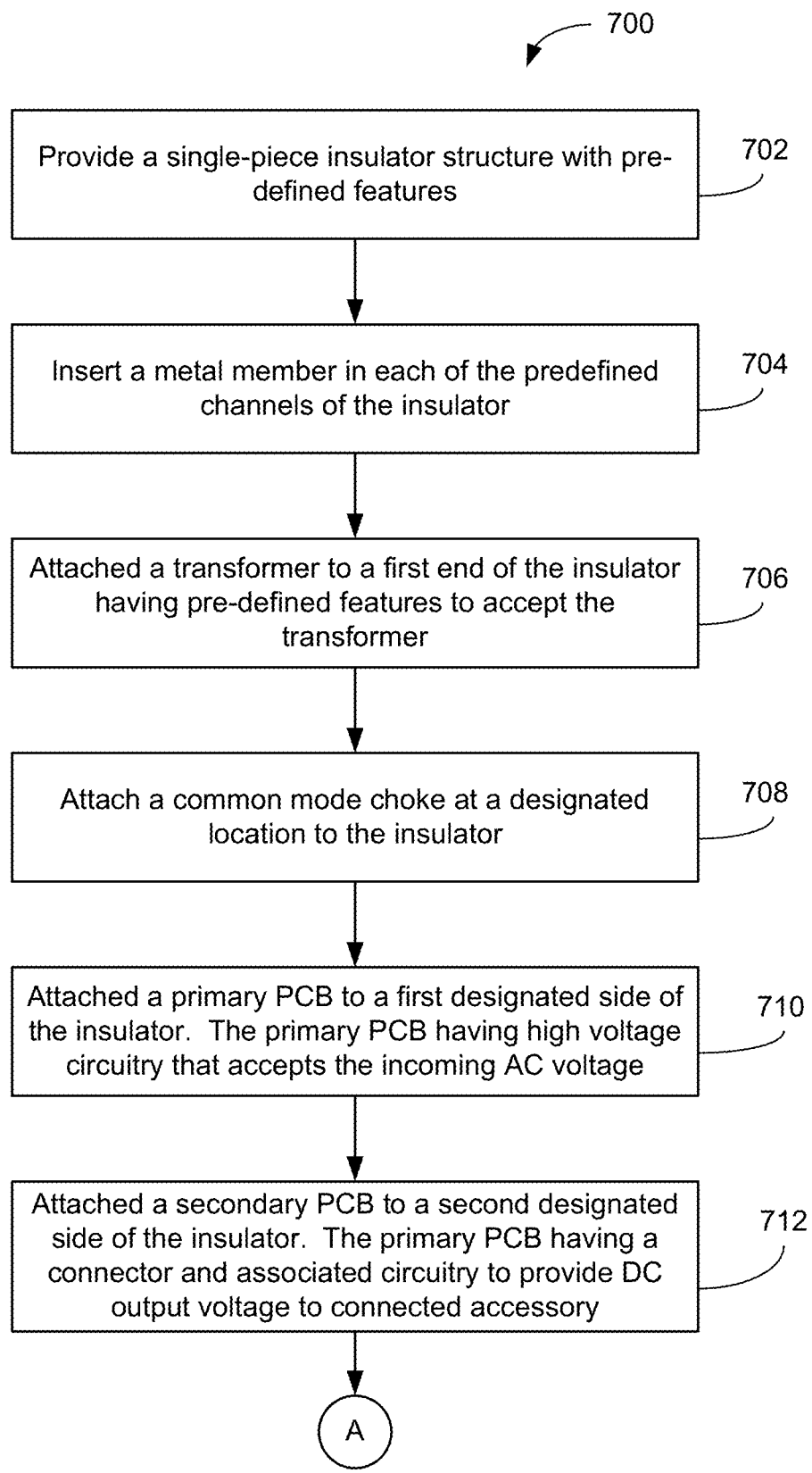
FIGS. 7A and 7B is a flow chart of a process for manufacturing a power adapter corresponding to FIGS. 6A-6J, according to an embodiment of the present invention.
Figure 7B:
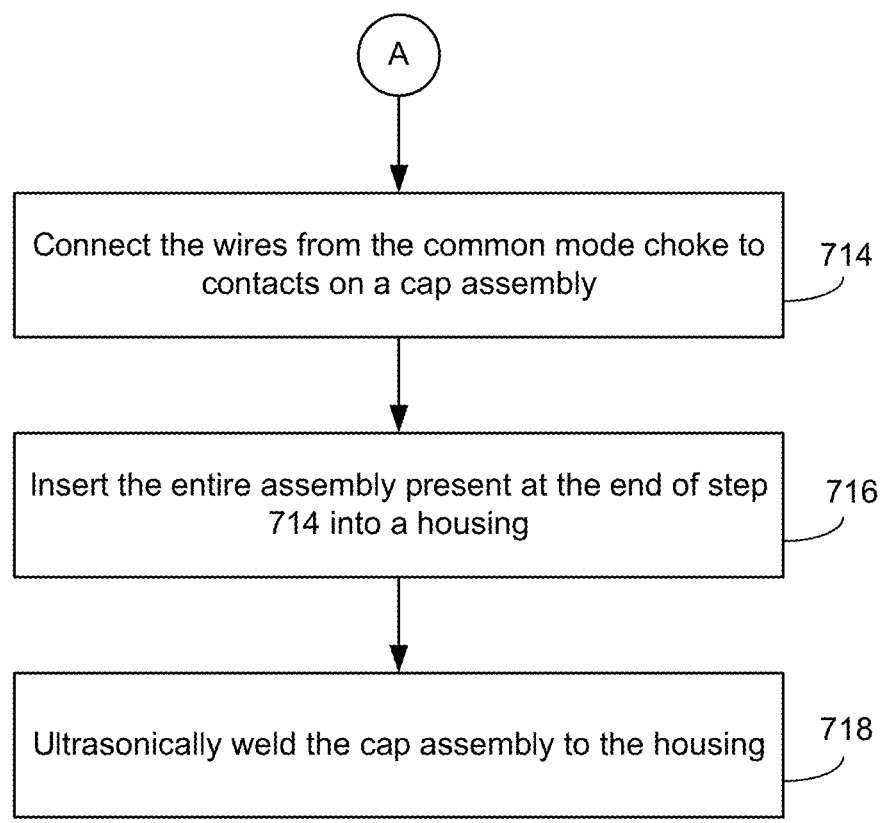

As illustrated in FIG. 6A, initially a single-piece insulator structure 600 may be provided (Step 702). As described above, single-piece insulator structure 600 may be made using glass-filled nylon that is introduced into a custom mold. Single-piece insulator structure 600 includes many features formed thereon as described above. Next, electrically conducting members 602 are inserted into the various channels that are formed in single-piece insulator structure 600 for that purpose (Step 704). Electrically conducting members may be made of any suitable conducting material such as copper clad steel, brass, aluminum, conductive metal alloys, etc. As described above, the electrically conducting members/pins provide an electrical path between the high-voltage circuitry and the low-voltage circuitry of the adapter.

Figure 6B:
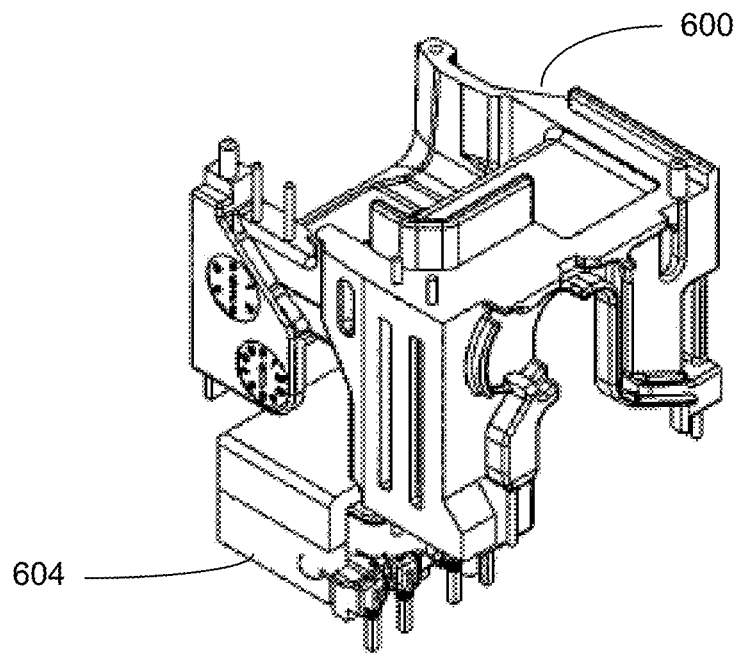
Figure 6C:
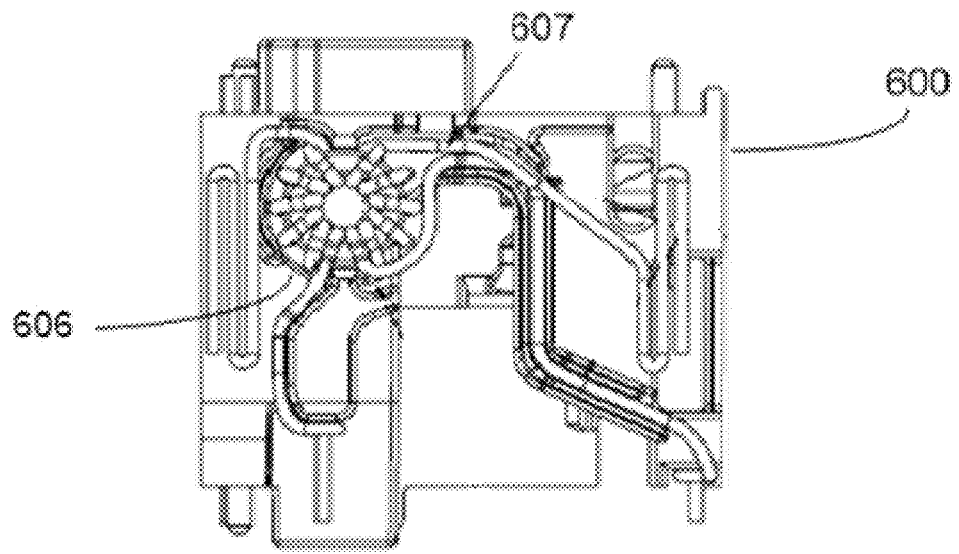

Next, power transformer 604 is inserted in a recess of single-piece insulator structure 600 that is designed to accept the power transformer, as illustrated in FIG. 6B and Step 706. In some embodiments, an adhesive such as epoxy-based glue is applied around power transformer 604 and a compressive force is applied to the power transformer for a predetermined time in order to further ensure that the attachment of transformer 604 to single-piece insulator structure 600 is robust. Thereafter, a common mode choke 606 is attached to single-piece insulator structure 600 as illustrated in FIG. 6C (Step 708). Wires from common mode choke 606 are routed via designated channels 607. The use of pre-formed channels helps to keep the common mode choke wires in the right location (e.g., they remain tight and close to insulator structure 600 which makes installation of the completed subassembly in housing 102 significantly more efficient) and also increases overall manufacturing efficiency in that channels maintain the wires in the proper location for termination to other components downstream in the manufacturing process.

Figure 6D:
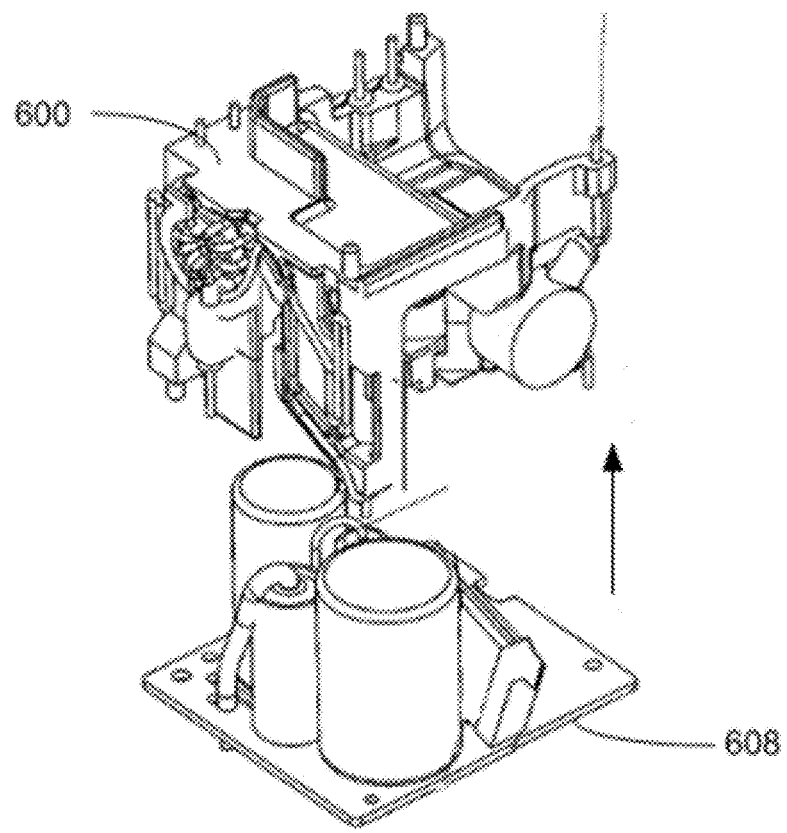
Figure 6E:
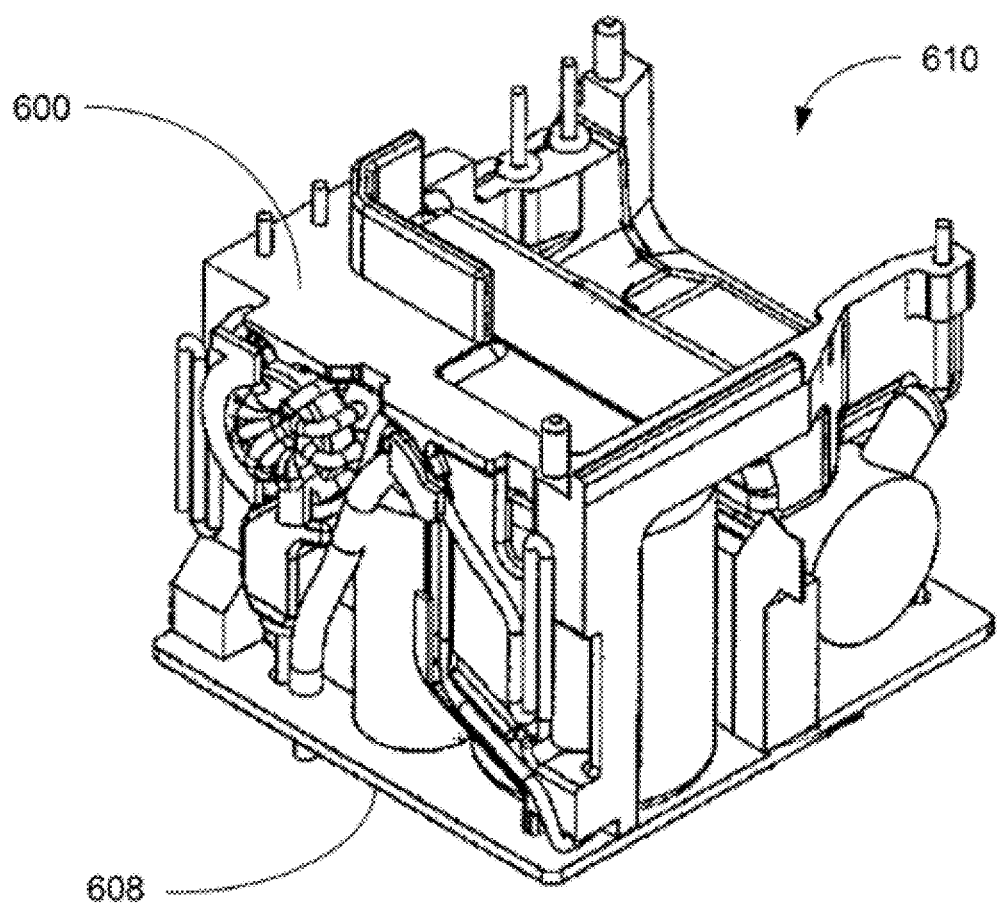

Thereafter, a primary PCB 608 is attached to single-piece insulator structure 600 at a designated side as illustrated in FIG. 6D (Step 710). As described above, primary PCB 608 has high-voltage circuitry that interacts with the incoming AC voltage. In some embodiments, an adhesive may be used to further make the attachment of primary PCB 608 to single-piece insulator 600 more robust. FIG. 6E illustrates assembly 610 that includes the single-piece insulator, the common mode choke, and the primary PCB attached together. Assembly 610 is shown flipped over to reveal the region of single-piece insulator that can accept the secondary PCB. During this process, visual inspections may be performed to insure that each of the components ends up in the proper location and that all wires/pins that were intended to extend through holes in PCB 608 have done so (which the inspection process is suggested, the use of insulator structure 600 in the process greatly increases the likelihood that the manufacturing process has been accomplished without error). Once insulator structure 600 and primary PCB 608 have been successfully mated together, a wave solder process can be used to solder the pins, capacitors and other components to primary PCB 608, at which point the subassembly is substantially complete.

Figure 6F:
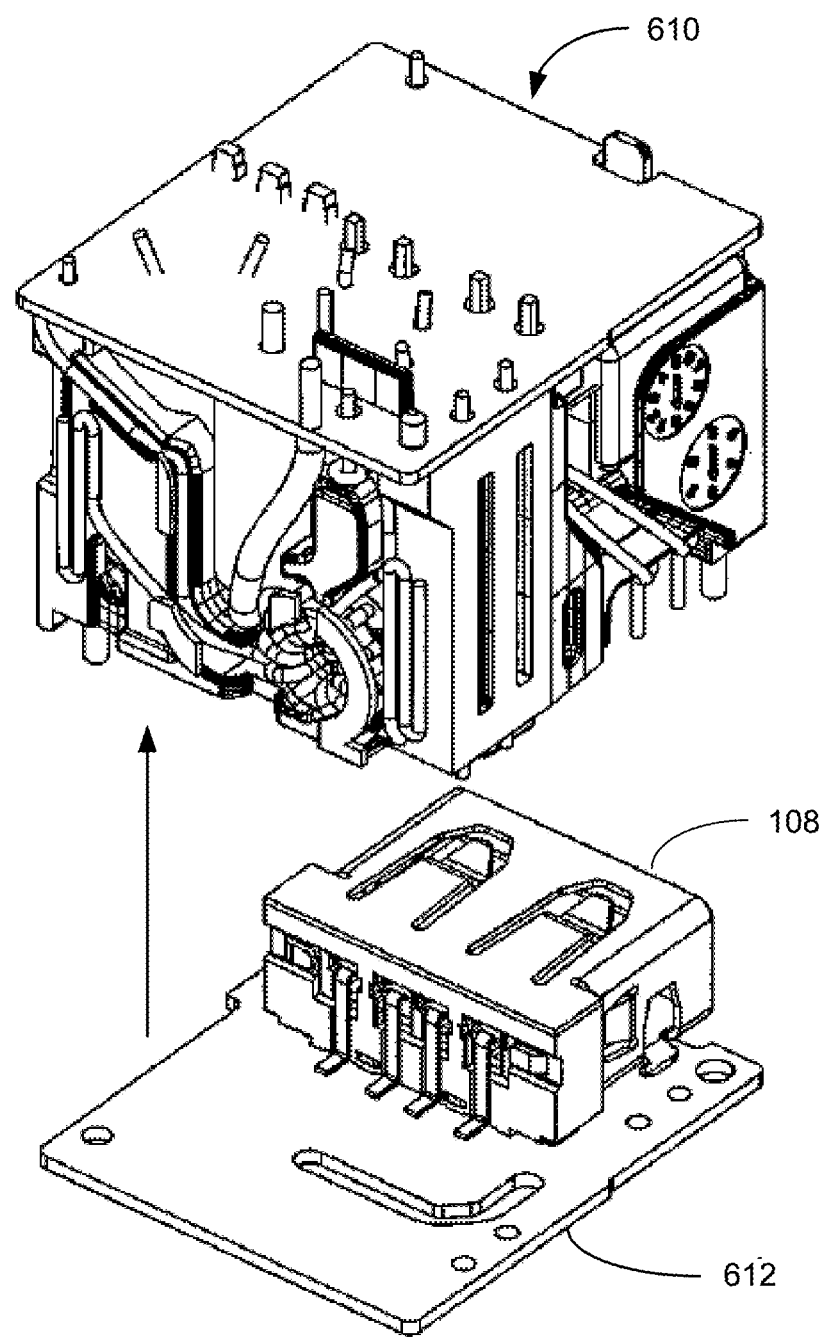
Figure 6G:
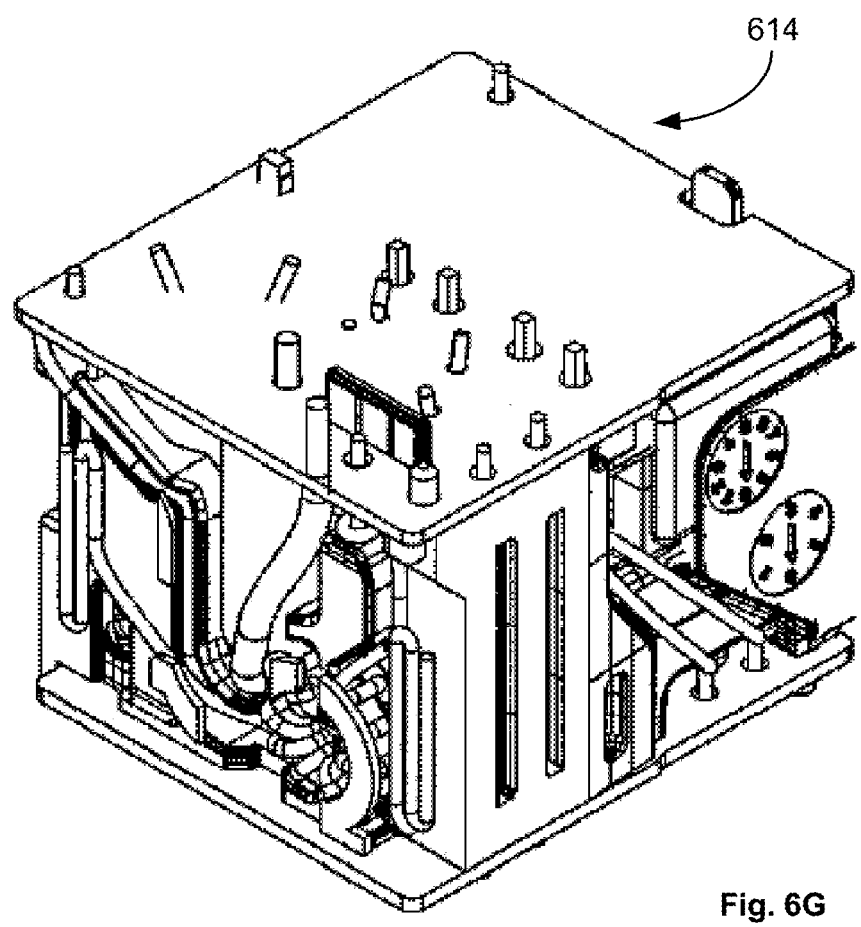

Next, a secondary PCB 612 is attached to assembly 610 as illustrated in FIG. 6F (Step 712). Secondary PCB includes low-voltage circuitry and connector 108, which is described above. The low voltage circuitry may include, e.g., filter circuitry to smooth out the DC output voltage before it is provided to a connected external device. FIG. 6G shows a completely electrical assembly 614. Assembly 614 is similar to assembly 202 illustrated in FIG. 2. Another wave soldering process can be utilized to secure and electrically couple connector 108 (and any additional discrete components needs (not shown)) to secondary PCB 612, as well as securing and electrically coupling the appropriate pins to secondary PCB 612.

Figure 6H:
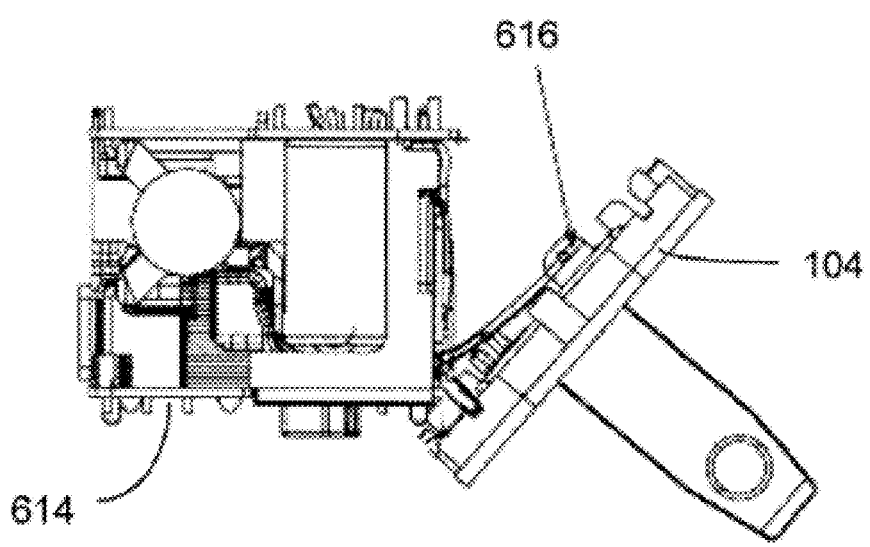
Figure 6I:
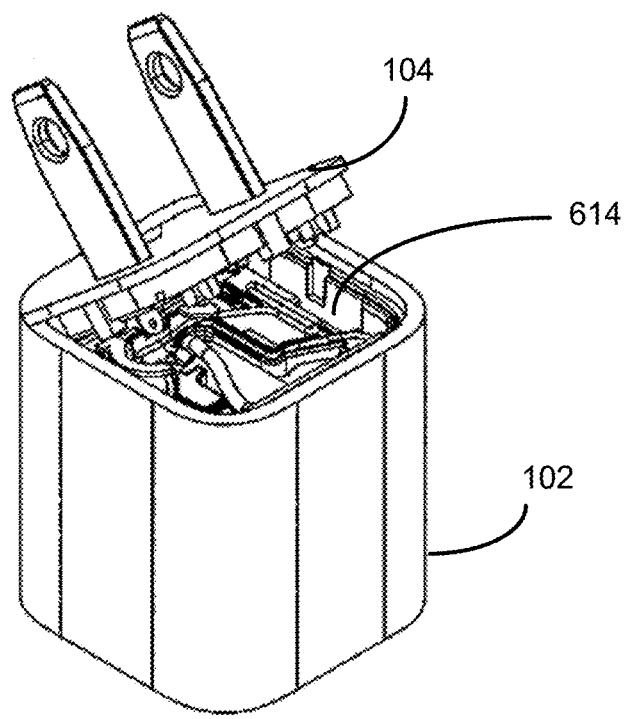
Figure 6J:
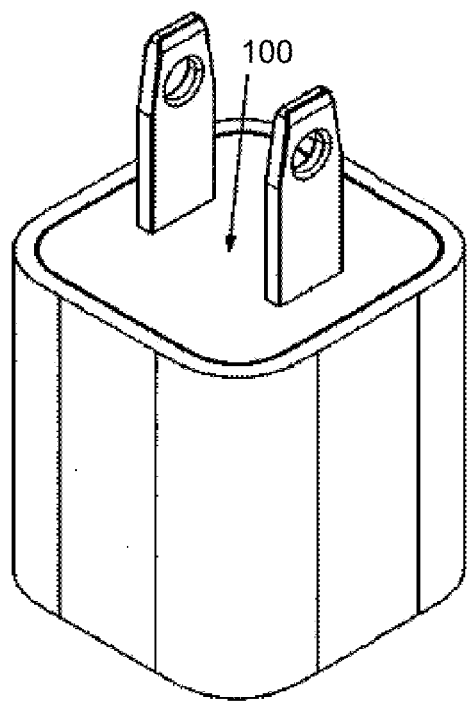

Next, the inputs to the primary stage of the transformer of assembly 614 are connected to input terminals 616 of cap assembly 104 (Step 714) which provides the capability for wall power to be coupled to the primary stage of the transformer when the completed power adapter is plugged into a wall outlet, as illustrated in FIG. 6H. Thereafter, the entire assembly 614 is inserted into adapter housing 102 (Step 716), as illustrated in FIG. 6I. Once the assembly is inserted into housing 102, cap assembly 104 is welded to housing 102 using ultrasonic welding (Step 718). At the end of the assembly process power adapter 100 is complete as illustrated in FIG. 6J.

It should be appreciated that the specific steps illustrated in FIGS. 6A-6J and 7A-7B provide a particular method of manufacturing a power adapter according to an embodiment of the present invention. Other sequences of steps may also be performed according to alternative embodiments. For example, alternative embodiments of the present invention may perform the steps outlined above in a different order. Moreover, the individual steps illustrated in FIGS. 6A-6J and 7A-7B may include multiple sub-steps that may be performed in various sequences as appropriate to the individual step. Furthermore, additional steps may be added or removed depending on the particular applications. One of ordinary skill in the art would recognize many variations, modifications, and alternatives.

Also, while a number of specific embodiments were disclosed with specific features, a person of skill in the art will recognize instances where the features of one embodiment can be combined with the features of another embodiment. Also, those skilled in the art will recognize, or be able to ascertain using no more than routine experimentation, many equivalents to the specific embodiments of the inventions described herein. Such equivalents are intended to be encompassed by the following claims.

What is claimed is:
1. A power adapter comprising:
a first connector;
a first electrical assembly coupled to the first connector and comprising a plurality of AC to DC converter components, wherein the first electrical assembly is configured to receive an incoming AC voltage and convert it to a DC voltage using the plurality of AC to DC converter components;
a second connector;
a second electrical assembly coupled to the second connector and configured to accept the DC voltage and output the DC voltage via the second connector; and
a single-piece insulator unit having a first side including one or more first recesses that receive at least one of the plurality of AC to DC converter components and a second side including one or more second recesses that receive at least a portion of the second electrical assembly, wherein the first electrical assembly is disposed adjacent to the first side and the second electrical assembly is disposed adjacent to the second side; and
a housing enclosing the single-piece insulator unit and the first and the second electrical assemblies;
wherein the single-piece insulator unit electrically insulates the first electrical assembly from the second electrical assembly and comprises a region that is recessed from the housing and one or more electrical conductors are routed in the recessed region electrically coupling the first electrical assembly to the second electrical assembly.

2. The power adapter of claim 1 wherein the one or more electrical conductors couple DC voltage from the first electrical assembly to the second electrical assembly.

3. The power adapter of claim 1 wherein the single-piece insulator unit is formed from an insulative plastic material.

4. The power adapter of claim 1 wherein the first electrical assembly includes a first printed circuit board that is oriented parallel to and spaced apart from a second printed circuit board and the single-piece insulator unit is disposed between the first and the second printed circuit boards.

5. The power adapter of claim 1 wherein the one or more second recesses are formed to receive electronic components attached to the second electrical assembly.

6. The power adapter of claim 1 wherein the first connector is configured to connect to an AC wall outlet providing between 110-220 VAC.

7. The power adapter of claim 1 wherein the second connector is a Universal Serial Bus (USB) connector.

8. A power adapter comprising:
a first connector;
a first electrical assembly coupled to the first connector and configured to receive an incoming AC voltage and convert it to a DC voltage using a plurality of AC to DC converter components attached to the first electrical assembly;
a second connector;
a second electrical assembly coupled to the second connector and configured to accept the DC voltage and output the DC voltage via the second connector;
an insulative shell having a first side including one or more first recesses that receive at least one of the plurality of AC to DC converter components and a second side including one or more second recesses configured to receive at least a portion of the second electrical assembly such that the insulative shell electrically insulates the first electrical assembly from the second electrical assembly; and
one or more electrical conductors that couple DC voltage from the first electrical assembly to the second electrical assembly.

9. The power adapter of claim 8 wherein an exterior housing encloses the insulative shell and the first and the second electrical assemblies.

10. The power adapter of claim 9 wherein a portion of the insulative shell is recessed from the exterior housing creating a cavity formed between the first and the second electrical assemblies.

11. The power adapter of claim 10 wherein the one or more electrical conductors are disposed within the cavity.

12. The power adapter of claim 8 wherein the first electrical assembly includes a first printed circuit board and the second electrical assembly includes a second printed circuit board.

13. The power adapter of claim 12 wherein the first printed circuit board is oriented parallel to and spaced apart from the second printed circuit board such that each of the first and the second printed circuit boards have an inner surface that face each other and an outer surface that face away from each other.

14. The power adapter of claim 13 wherein each of the first and the second printed circuit boards have one or more electronic components disposed on the inner surface.

15. The power adapter of claim 14 wherein the insulative shell is disposed between the first and the second printed circuit board and includes one or more first and second recesses configured to receive the one or more electronic components.

16. A power adapter comprising:
a first connector;
a first electrical assembly coupled to the first connector and configured to receive an incoming AC voltage and convert it to a DC voltage using a plurality of AC to DC converter components attached to the first electrical assembly;
a second connector;
a second electrical assembly coupled to the second connector and configured to accept the DC voltage and output the DC voltage via the second connector;
a contoured plastic shell including one or more first cavities that receive at least one of the plurality of AC to DC converter components and one or more second cavities that receive at least a portion of the second electrical assembly, the contoured plastic shell configured to fit between and provide electrical insulation between the first electrical assembly and the second electrical assembly; and
one or more electrical conductors connected between the first and the second electrical assemblies to transfer DC voltage from the first electrical assembly to the second electrical assembly.

17. The power adapter of claim 16 wherein an exterior housing encloses the contoured plastic shell and the first and the second electrical assemblies.

18. The power adapter of claim 17 wherein a portion of the contoured plastic shell is recessed from the exterior housing creating a cavity formed between the first and the second electrical assemblies.

19. The power adapter of claim 18 wherein the one or more electrical conductors are disposed within the cavity.

20. The power adapter of claim 16 wherein the first connector is configured to connect to an AC wall outlet providing between 110-220 VAC and the second connector is a Universal Serial Bus (USB) connector.

* * * * *